United States Patent
Oviedo-Reyes

Patent Number: 5,522,184
Date of Patent: Jun. 4, 1996

[54] APPARATUS FOR STRENGTHENING BUILDING STRUCTURES

[76] Inventor: Alfonso Oviedo-Reyes, 8370 W. Flagler St., Suite 110, Miami, Fla. 33144

[21] Appl. No.: 371,640

[22] Filed: Jan. 12, 1995

[51] Int. Cl.[6] ............................................. E04B 7/00
[52] U.S. Cl. ....................... 52/23; 52/3; 52/4; 52/5; 52/DIG. 11
[58] Field of Search ............................ 52/23, 3, 4, 5, 52/DIG. 11, DIG. 12

[56] References Cited

U.S. PATENT DOCUMENTS

| | | | |
|---|---|---|---|
| 354,342 | 12/1886 | Pratt | 52/23 X |
| 490,780 | 1/1893 | Zimmerman | 52/23 X |
| 1,400,251 | 12/1921 | Van Cott | 52/23 X |
| 3,054,151 | 9/1962 | Shankland | 52/23 |
| 3,449,874 | 6/1969 | Beaupre | |
| 3,715,843 | 2/1973 | Ballinger | 52/3 |
| 3,869,836 | 3/1975 | Allen | 52/23 |
| 3,871,142 | 3/1975 | Abbott | 52/23 |
| 3,879,905 | 4/1975 | Catalano, Sr. | 52/23 |
| 5,319,896 | 6/1994 | Winger | 52/23 |
| 5,355,640 | 10/1994 | Frye | 52/23 |

Primary Examiner—Wynn E. Wood
Attorney, Agent, or Firm—J. Sanchelima

[57] ABSTRACT

An apparatus for strengthening building structure against hurricanes and wind storms. Several support beams are removably mounted adjacent to the building structure. A net member is positioned over the roof of the building structure. Cables are used to interconnect the support beam members and to keep the net in place. Anchorage assemblies keep support beam members in place. Tension adjusting devices are used to tighten the cables against the structure being protected.

5 Claims, 3 Drawing Sheets

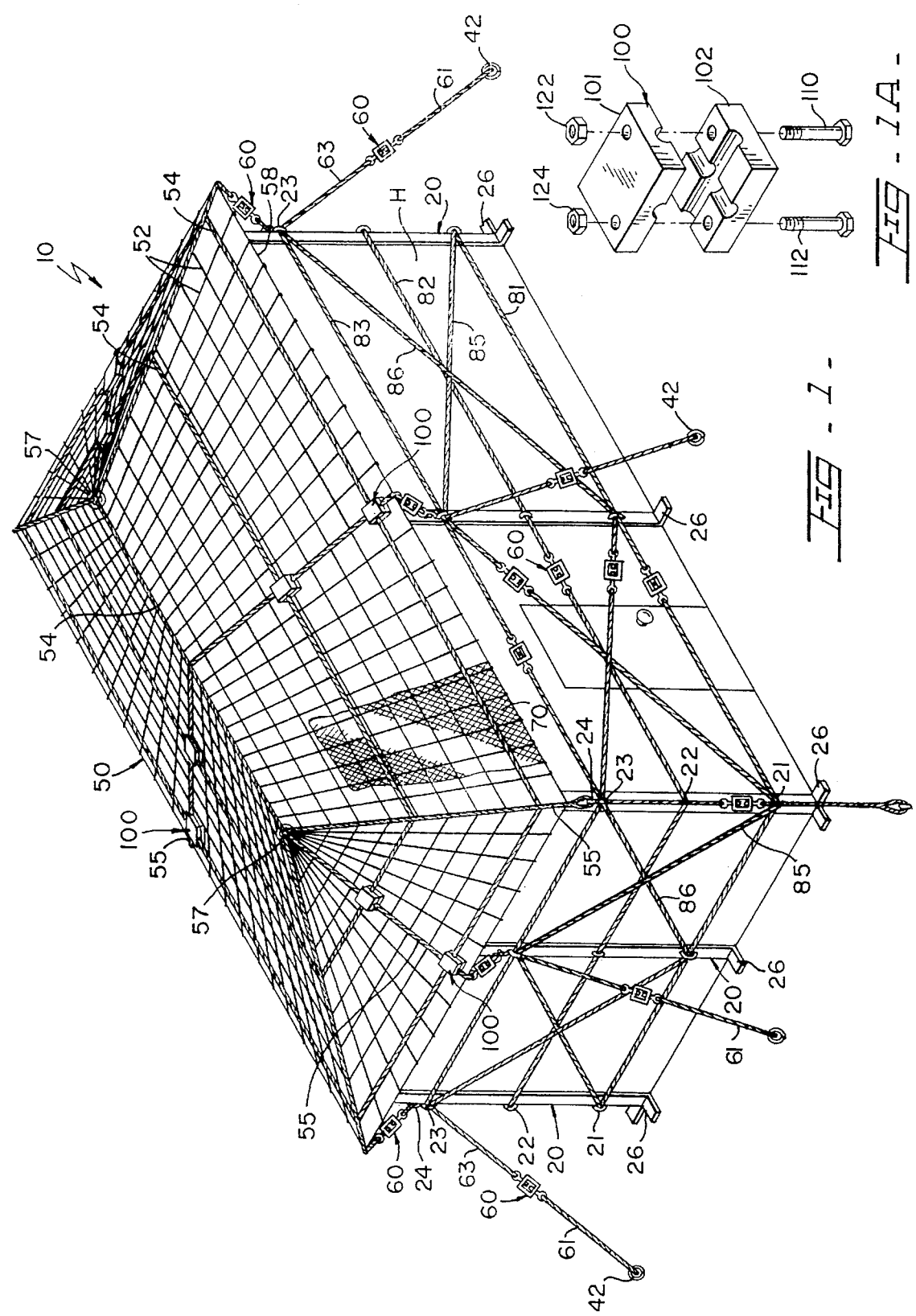

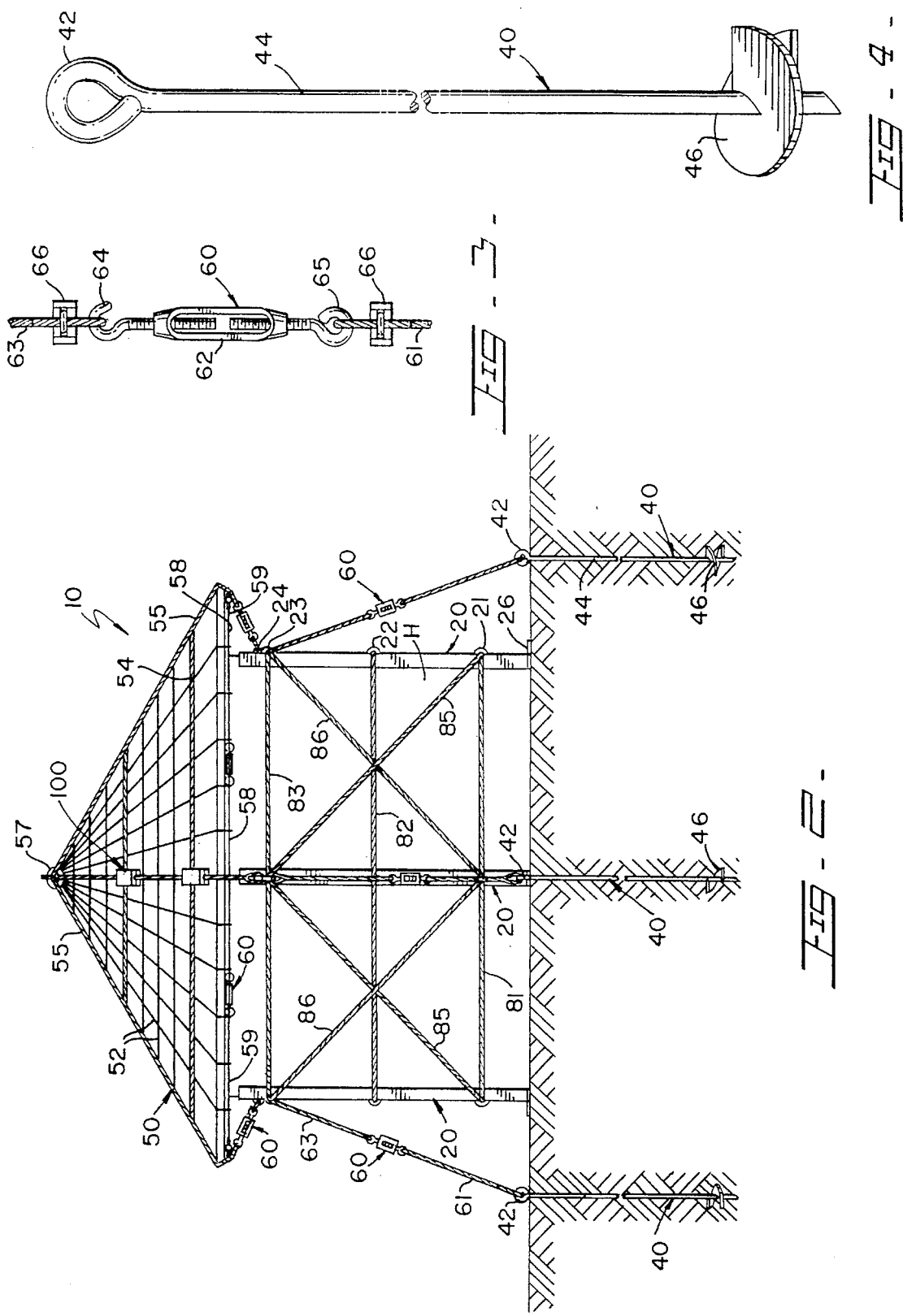

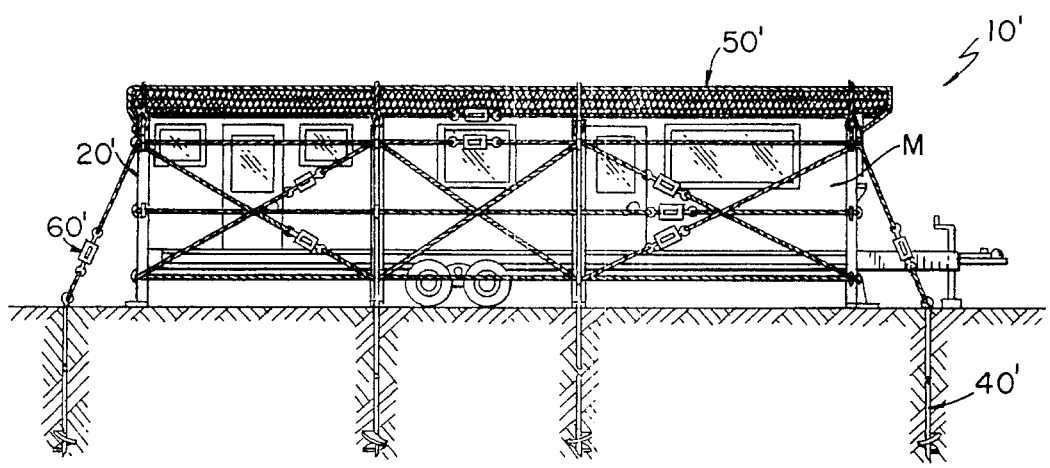
FIG - 7 -
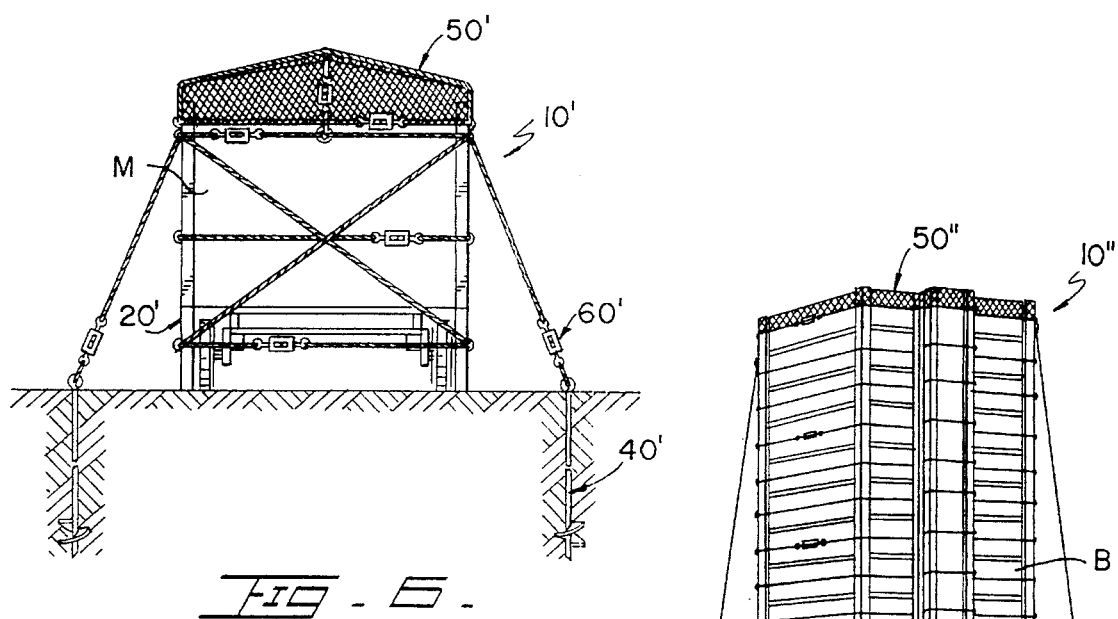
FIG - 6 -
FIG - 8 -
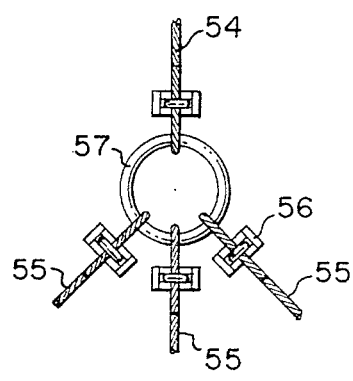
FIG - 5 -

5,522,184

APPARATUS FOR STRENGTHENING BUILDING STRUCTURES

BACKGROUND OF THE INVENTION

1. Field of the Invention

The present invention relates to an apparatus for strengthening building structures.

2. Description of the Related Art

Applicant believes that the closest reference corresponds to U.S. Pat. No. 3,449,874 issued to J. L. Beaupré in 1969 for a house anchorage. Beaupré's patent discloses anchoraging means for supporting and strengthening building structures during extreme weather conditions. However, it differs from the present invention in that the cables pass through slip plates 10, which are mounted to the wall of the building structure. In the present invention a plurality of removable support beams are erected around the building structure whereon fixed eyelet members are mounted. After the storm, the protecting structure is removed without leaving any irregularities on the building.

Other patents describing the closest subject matter provide for a number of more or less complicated features that fail to solve the problem in an efficient and economical way. None of these patents suggest the novel features of the present invention.

SUMMARY OF THE INVENTION

It is one of the primary objects of the present invention to provide an apparatus for strengthening buildings, houses, mobile-homes and automobiles from external forces such as winds from hurricanes and storms.

It is another object of the present invention to provide an apparatus that is portable, removable and reusable in buildings, houses, mobile-homes and automobiles.

It is another object of this invention to provide an apparatus that, when removed, does not leave any detracting irregularities of the structure being protected.

It is still another object of this invention to provide an apparatus that is volumetrically efficient for storage.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric view of the present invention where the fishing net has been partially represented.

FIG. 1A shows an enlarged view of the bracket member selectively used at the cable's intersections shown in FIGS. 1 and 2.

FIG. 2 represents an elevational side view of a structure where elements of the present invention are shown above and below the ground level.

FIG. 3 shows an elevational view of a tension adjusting assembly used in this invention.

FIG. 4 is an isometric view of an anchorage assembly used in this invention.

FIG. 5 is an illustration of a ring used to connect different cables on different areas.

FIG. 6 represents an elevational side view of a mobile home being protected with the present invention.

FIG. 7 represents an elevational front view of the mobile home shown in FIG. 6.

FIG. 8 is a perspective illustration of another application for the present invention, namely, a multi-floor building.

DETAILED DESCRIPTION OF THE PREFERRED EMBODIMENT

Referring now to the drawings, where the present invention is generally referred to with numeral 10, it can be observed that it basically includes elongated support beams 20, anchorage assemblies 40, roof net assembly 50, which along with tension adjusting assemblies 60 achieve the desired protection to the building structure.

As is shown in FIGS. 1 and 2, elongated support beams 20 include, in the preferred embodiment, spaced apart eyelet members 21; 22; 23 and 24, through which different cable members pass. Cable members 81; 82 and 83 pass through lower eyelet member 21, intermediate eyelet member 22 and anchorage eyelet member 23, respectively. Anchorage eyelet member 23 also receives cable member 63 which is tied to tension adjusting assembly 60. Cable member 61 is tied to the other end of tension adjusting assembly 60. The other end of cable member 61 is tied to eyelet member 42 of anchorage assembly 40. Cable members 81; 82 and 83 are flexible and preferably made out of steel, but a fiber or plastic cord can also be used. Supporting base 26 is integrally built at the end of support beams 20. Criss-crossed cable members 85 and 86 contribute to strengthen the building structure. Criss-crossed cable members 85 and 86 pass through lower eyelet member 21 and anchorage eyelet member 23 of different support beams 20 selectively and in zig-zag.

Several anchorage assemblies 40 are buried next to the structure being protected. As shown in FIG. 4, assemblies 40 include elongated rods 44 and helical ends 46. One end of cable 61 is tied to eyelet member 42. Anchorage assembly 40 is firmly anchored by turning it in combination with a downward force.

Roof net assembly 50, in the preferred embodiment, has horizontally disposed cables 54, running parallel and in a spaced apart relationship with respect to each other. Net assembly 50 also has cables 55, running substantially vertically and spaced apart from each other. Cords 52 are similar to cables 54 and 55 but with a smaller diameter. Cords 52 run vertically and horizontally with respect to each other, thereby conforming a criss-crossed net. Fishing net 70 is composed of criss-crossed threads that are flexible and form small dimensioned grids, as it is partially shown in FIG. 1. Only one small area of net 70 is shown in FIG. 1 to avoid overcrowded lining. The cooperative combination of all of the above mentioned elements conform the protecting assembly of the present invention for the top of the structures being protected. In FIG. 1 and 2, cable members 85 and 86 are tightened by tension adjusting assemblies 60. Assemblies 60 are preferably located near the entrance of the structure being protected. In case of emergency, if it is necessary to take away cable members 85 and 86, occupants may readily exit. Cables 55 are tied to upper eyelet members 24 through tension adjusting assemblies 60. Tension is adjusted by turning turn-buckle 62 of cable tension adjusting assembly 60, as is seen in FIG. 3.

FIG. 5 shows ring 57 providing a connecting hub to the ends of cables 54 and 55. Ring 57 keeps horizontal cables 54 and perpendicularly disposed cables 55 in a pre-determined relationship with respect to each other and ensures that net assembly 50 is properly adjusted, as is best seen in FIGS. 1 and 5. Clamp members 56, at the end of cable members 54 and 55, hold the cables to securely form a loop.

Once the roof of the building structure is covered by roof net assembly 50, the end or edge 58 of net assembly 50 is tensed by cable 59 as shown under the overhang in FIG. 2. This will ensure that net assembly 50 will be tight against the roof surface.

Roof net assembly 50, in the preferred embodiment, is the result of combining several elements that cover a building roof. Fishing net 70 is the lowermost component of roof net assembly 50. Cords 52 are superimposed over fishing net 70. Finally, cable members 54 and 55 are positioned over cords 52. In this manner, the structural integrity is enhanced to withstand the wind action.

In FIG. 3 one end of cable 63 is attached to threaded hook member 64 which is screwed in turn-buckle member 62. The other end of member 62 receives threaded eyelet member 65 which is tied to cable 61. By turning turn-buckle member 62 the tension of cables 61 and 63 can be adjusted transmitting the tension along the entire building structure. Clamp members 66, at the end of cables 63 and 65, hold the cables to securely form a loop.

In FIGS. 6, 7 and 8, other applications are illustrated using the present invention. Devices 10' is shown in FIGS. 6 and 7 protecting mobile-home M. As in device 10 protecting house H shown in FIGS. 1 through 5, device 10' uses similar components that have been mashed with a prime.

Also, in FIG. 8 device 10" is shown multi-floor building B protecting against hurricanes and strong wind-storms. As in devices 10 and 10' shown in FIGS. 1 through 5 and 6 and 7, device 10" uses similar components that have been mashed with a double prime.

To prevent cable members 54 and 55 from sliding out of place, bracket members 100 are selectively positioned at their intersections, as shown in FIGS. 1 and 1A. Member 100, in the preferred embodiment, includes two symmetrical blocks 101 and 102 sandwiching cable members 54 and 55. Block members 101 and 102 are fasten together by screw and nut members 110; 112;122 and 124.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus for protecting a building structure from wind storms and hurricanes, comprising:

A. a plurality of beam members removably and vertically mounted on the periphery of and adjacent to a building structure;

B. first cable means interconnecting said beam members;

C. anchorage means for supporting said beam members firmly on the ground;

D. a net member mounted over said building structure;

E. second cable means positioned over said net member and second cable means being tied to said beam members, and F. first means for adjusting the tension of said first and second cable means.

2. The apparatus set forth in claim I wherein said beam members include a plurality of eyelet members that cooperatively receive said first and second cable means.

3. The apparatus set forth in claim 2 wherein further including:

G. cord means having a diameter that is smaller than said first and second cable means and said first cord means being disposed over said net member and below said second cable means and;

H. second means for adjusting the tension of said cord means.

4. The apparatus set forth in claim 3 wherein said anchorage means includes an elongated rod including a helical end and an eyelet end.

5. The apparatus set forth in claim 4 further including:

I. a plurality of bracket means for fastening said second cable means at a predetermined position.

* * * * *